United States Patent [19]

Alexander et al.

[11] 4,142,610

[45] Mar. 6, 1979

[54] SELF ADJUSTING HOIST BRAKE

[75] Inventors: Thomas J. Alexander, Beverly Hills; Walter Wilson, Westland, both of Mich.

[73] Assignee: Eaton Corporation, Cleveland, Ohio

[21] Appl. No.: 850,989

[22] Filed: Nov. 14, 1977

[51] Int. Cl.² ............................................. F16D 65/56
[52] U.S. Cl. ..................... 188/71.9; 188/171; 188/196 BA; 192/70.26; 192/70.27; 192/90; 192/111 A; 310/77
[58] Field of Search ............ 188/71.8, 71.9, 196 BA, 188/171, 173, 166, 167, 170, 72.1, 72.3; 192/111 A, 90, 70.25, 70.26, 70.27; 310/27; 318/372

[56] References Cited

U.S. PATENT DOCUMENTS

| | | | |
|---|---|---|---|
| 2,966,240 | 12/1960 | Aude et al. | 188/171 |
| 3,289,797 | 12/1966 | Brzezinski et al. | 188/171 |
| 3,613,849 | 10/1971 | Pape | 192/111 A |
| 3,783,984 | 1/1974 | Knapp et al. | 188/71.9 X |

FOREIGN PATENT DOCUMENTS 524752  5/1956  Canada .............................. 192/111 A

*Primary Examiner*—George E. A. Halvosa
*Attorney, Agent, or Firm*—J. Gordon Lewis

[57] ABSTRACT

A hoist brake with an incremental self adjusting feature. The brake has interdigitated plates which will stop a driven shaft when engaged and allow the shaft to rotate when not engaged. The brake is normally biased into an engaged position and an electromagnet is provided to disengage the brake. A sensing apparatus is provided which measures the gap traversed by a portion of the brake when the brake is activated, the traverse indicating the amount of wear which has taken place since the last adjustment. When the amount of wear is greater than a predetermined amount, the distance between the electromagnet and associated plate on which it acts is incrementally reduced the next time the brake is activated to adjust the gap and insure continued proper performance.

6 Claims, 4 Drawing Figures

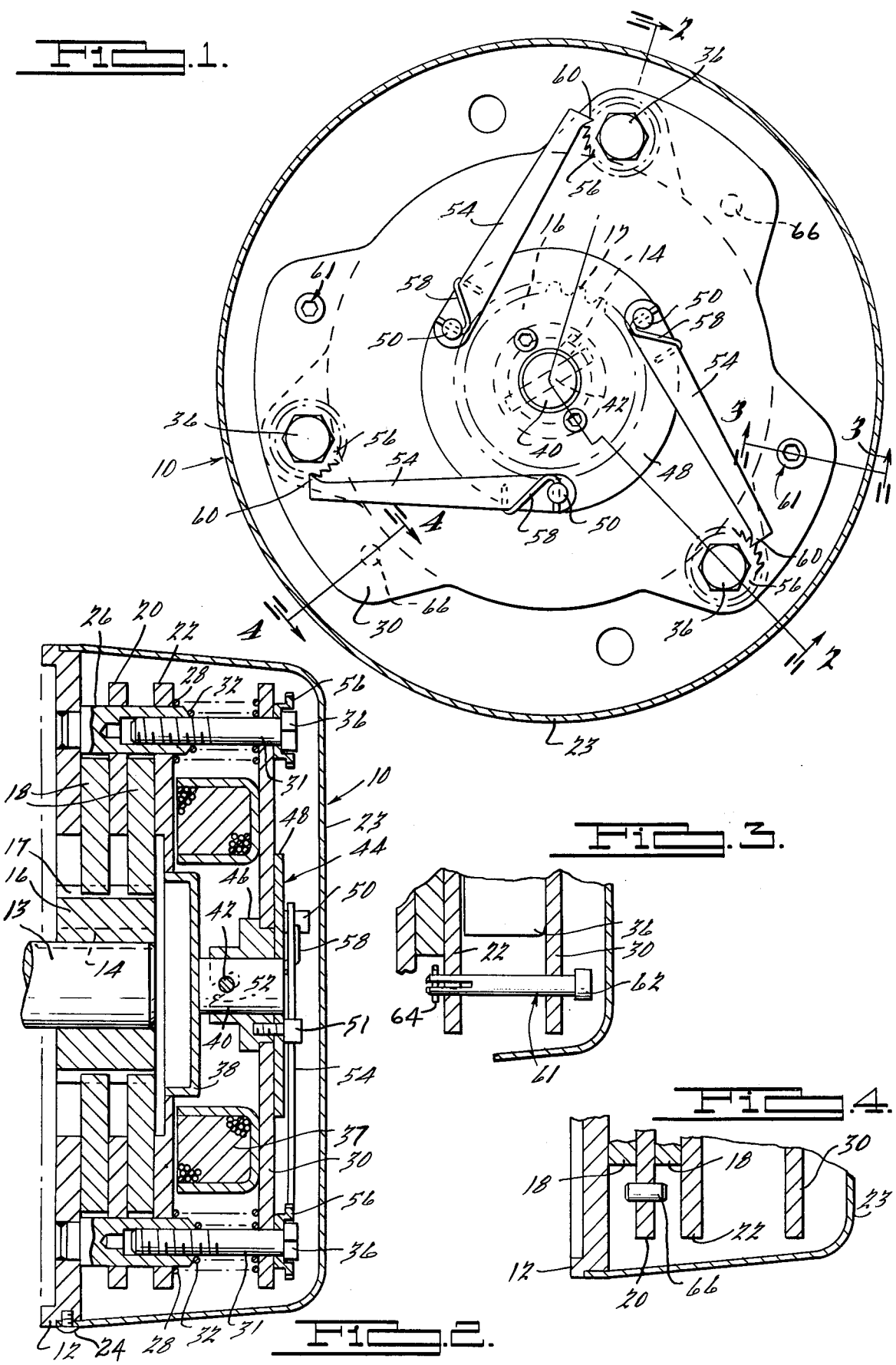

SELF ADJUSTING HOIST BRAKE

BACKGROUND OF THE INVENTION

1. Field of the Invention

In one aspect, this invention relates to braking devices for hoists. In a further aspect, this invention relates to adjusting means for braking devices.

2. Prior Art

Adjusting means for clutches and brakes are known in the art. The prior art provides acceptable brakes and clutches for most applications. However, for brakes used on hoists it is desirable to have a fast acting, rapid stopping brake to permit accurate positioning of a load.

SUMMARY OF THE INVENTION

Briefly, the brake of this invention has interdigitated discs and plates which will quickly stop a load or motor when activated. The brake has means associated therewith to sense when the plates and discs have become worn. An adjusting means associated with the sensing means will incrementally adjust the spacing between the plates and discs to insure the brake continues to function rapidly, with minimal maintenance.

As a further feature, the brake is provided with a manual release mechanism to allow manual disengagement of the brake should the brake be locked due to some type of power or machine failure.

BRIEF DESCRIPTION OF THE DRAWING

In the accompanying drawing:

FIG. 1 is a front view of one embodiment of this invention with a portion of the housing cover broken away;

FIG. 2 is a sectional view taken along the line 2—2 of FIG. 1;

FIG. 3 is a view of a manual release means of FIG. 1; and

FIG. 4 is a sectional view of a wear limit stop pin taken along the line 4—4 of FIG. 1.

DETAILED DESCRIPTION OF A PREFERRED EMBODIMENT

In general, the brake of this invention can be used in combination with an electric motor driven hoist. As shown, the brake 10 would be attached to one end of an electric motor (not shown) by means of a mounting plate 12 and has a housing cover 23 attached thereto by a screw 24 to form an enclosure for the brake. The electric motor and hoisting means are not shown, such structures being well known in the art. The brake 10 of this invention is attached to the shaft 13 of the electric motor by means of a key 14.

Referring initially to FIG. 2, a splined sleeve 16 is locked to the shaft for rotational motion by means of the key 14 and would also be locked with respect to longitudinal motion such as by a set screw (not shown). A plurality of splines 17 extend axially from the sleeve 16 and engage the inner portion of a pair of friction discs 18 thereby providing the friction discs rotational motion and allowing limited axial movement. The friction discs 18 can be made from various friction materials well known in the brake art. The friction discs 18 are interdigitated with annular plates 20 and 22. The annular plates 20, 22 have a plurality of apertures therethrough which engage a corresponding number of studs 26 which have one end mounted in the mounting plate 12 and extend axially parallel to the shaft 13. The studs 26 prevent the plates 20 and 22 from rotating but allow limited axial movement of the plates.

The plates 20, 22 and friction discs 18 are normally biased into engagement by a plurality of springs 28 which have one end in contact with the plate 22 and the other end engages magnet backing plate 20 which is mounted on a plurality of threaded, self-locking bolts 31 the bolts being threaded into studs 26. A second set of springs 32 bias the magnet backing plate 30 away from the studs 26 to maintain the magnet backing plate in a flat plane separated from the plate 22. One end of each spring 32 rests on a corresponding stud 26 and the other end is firmly set on the magnet backing plate 30. The distance between the magnet backing plate 30 and the end of stud 26 is determined by the position of the heads 36 of bolts 31. The bolts 31 can be rotated relative to the studs to move the heads closer or further away from the studs.

An annular electromagnet 37 is mounted on magnet backing plate 30. When the brake 10 is engaged the springs have biased the plates 12, 20, 22 and friction discs 18 into frictional engagement preventing the shaft 13 from rotating. When it is desired to rotate shaft 13, the electromagnet 37 is energized attracting plate 22 which allows the friction discs and plates to separate. As soon as electric power to the electromagnet is interrupted, the springs 28 snap the brake 10 into engagement.

To maintain the brakes efficiency, it is desirable to maintain the gap between the electromagnet 37 and plate 22 within certain limits. The present brake structure has means associated therewith to measure the gap between the electromagnet 37 and the plate 22. The plate 22 has a cup-shaped member 38 attached thereto. A post 40 projects axially from the cup-shaped member 38 towards the magnet backing plate 30. A cylindrical pin 42 projects radially outward from the post 40.

The magnet backing plate 30 has a rotatable member designated generally 44 which includes a hub 46, a washer 48, and a plurality of pins 50 the member being joined by screws 51. The hub 46 has a helical groove 52 which extends at an oblique angle to the axis of the post 40. As the post 40 and pin 42 move axially, when the electromagnet attracts the plate 22, the groove 52 acts as a follower on pin 42 rotating the rotatable member 44. The degree of rotation is directly proportional to the gap between plate 22 and the electromagnet 37 before the plate is attracted.

The rotatable means 44 acts on means for incrementally adjusting the gap. As shown, a plurality of arms 54 have one end rotatably mounted on the pins 50 and have the other, free end biased into engagement with a toothed cup 56 by means of a shaped spring 58. Each spring 58 has one end anchored in a corresponding pin 50 and the other end engaging a side of its corresponding arm 54. The spring 58 keeps a detent 60 on the free end of arm 54 in contact with the toothed cup 56. When the rotating member 44 is rotated counterclockwise, as shown in FIG. 1, during the brake's engagement the arm 54 is also moved dragging the detent. If the member 44 rotates sufficiently to drag the detent 60 into engagement, with the next tooth on toothed cup 56, when the brake is disengaged by electromagnet 37, the arms 54 will rotate the toothed cup 56. The toothed cup 56 is shaped so that the head of the bolt 31 is rotated with the cup thereby screwing the bolt into the stud 26 and incrementally decreasing the gap. A toothed cup 56 is shown, however a bolt having a toothed head could also be used.

To disengage the brake, when there is no power provided to the electromagnet, requires retracting the plate 22 from the remaining discs and plates. FIG. 3 shows a manual disengaging means which can be used to draw the plate 22 towards the magnet backing plate 30 against the biasing force of springs 28. Threaded self-locking screws 61 extend through the magnet backing plate 30 and engage a threaded aperture in plate 22. By turning the screw 61, the head 62 will contact the magnet backing plate and further tightening will draw plate 22 towards the magnet backing plate 30 disengaging the brake 10. After the desired repair or maintenance has been done, the screw 61 would be reversed and the springs 28 would re-engage the brake. A pin 64 is provided near one end of the screw 61 to avoid backing the screw out of the plate 22 when the screw is backed out to re-engage the brake.

An additional feature which can be added to this invention are limit stop pins 66 shown in FIG. 4. The limit stop pins 66 are placed near the periphery of the middle plate 20. When the friction discs 18 have become worn to a predetermined thickness, the limit pins 66 will prevent the discs 20, 22 from tightly engaging the friction discs generating changed hoist operating characteristics which signal the operator that the friction discs 18 are worn. The friction discs 18 can then be changed before they fail catastrophically.

Various modifications and alterations will become apparent to those skilled in the art without departing from the scope and spirit of this invention. It is understood that this invention is not limited to the particular embodiment described hereinbefore.

What is claimed is:

1. A braking mechanism for use with a hoist mechanism having a driven shaft, said braking mechanism comprising:
   a plurality of discs mounted on said shaft and adapted for movement longitudinally along the axis of the shaft and rotationally fixed to said shaft;
   a corresponding plurality of annular plates interdigitated between said discs, said plates being mounted on at least two studs having longitudinal axes parallel to and spaced from said shaft, said studs passing through apertures in said plates to allow longitudinal motion of said plates along said studs but prevent rotation of said plates;
   a plurality of threaded members such as bolts supportively passing through apertures in a backing piece, each member coaxially engaging a stud and allowing longitudinal motion of the backing piece therealong and spaced from the plate nearest said backing piece;
   first resilient means located between said backing piece and said studs and operative to bias the backing piece longitudinally away from the ends of said studs;
   second resilient means located between said backing piece and nearest plate and operative to bias the nearest plate longitudinally away from said backing piece into frictional engagement with said discs and other plates to stop rotation of the shaft;
   moving means mounted to said backing piece for displacing at least one of said plates to a disengaged position against the force of the second resilient means to allow said shaft to rotate;
   means for sensing the separation between said moving means and said plates and thereby the wear on said discs and said plates; and
   means for incrementally adjusting the distance between said plates and moving means by simultaneously advancing said threaded members into said studs when said separation exceeds a predetermined limit.

2. The braking mechanism of claim 1, wherein said first and second resilient means comprise coil springs disposed coaxially with said threaded members.

3. The braking mechanism of claim 1 wherein said moving means comprises:
   an electromagnet mounted on the backing piece, the electromagnet being positioned so as to attract the closest annular plate when energized thereby disengaging the brake and allowing the shaft to rotate.

4. The braking mechanism of claim 3 wherein said backing piece has a plurality of apertures engaging a plurality of threaded bolts, the bolts having a toothed cup associated therewith said cup having a plurality of peripheral teeth;
   arms having a first end rotatably attached to said sensing means and a second detent end biased into engagement with said toothed cup, whereby when said sensing means rotates more than a predetermined arc, the arms will rotate the threaded cups and thereby said bolts an incremental amount to adjust the separation between the electromagnet and the closest plate.

5. The braking mechanism of claim 1 wherein said means for sensing the gap between said plates and moving means further includes:
   a cup mounted on said plate furthest from the hoist mechanism;
   a post mounted on the cup, the posts' axis being parallel with the axis of the shaft, and having a pin member extending radially outward from said post; and
   a hub rotatably mounted in said backing piece, the hub having a helical groove engaging said pin, said hub being rotated by said pin when said post is moved axially during disengagement of the brake, said hub being adapted to activate said adjustment means.

6. A braking mechanism for use with a hoist mechanism having a driven shaft, said braking mechanism comprising:
   a plurality of discs mounted on said shaft and adapted for movement longitudinally along the axis of the shaft and rotationally fixed to said shaft;
   a corresponding plurality of annular plates interdigitated between said discs, said plates being mounted on at least two studs having longitudinal axes parallel to and spaced from said shaft, said studs passing through apertures in said plates to allow longitudinal motion of said plates along said studs but prevent rotation of said plates;
   a plurality of bolts supportively passing through apertures in a backing piece and coaxially threadably engaging said studs, said backing piece being free for longitudinal movement along said bolts and spaced from the nearest plate;
   first and second coil springs disposed coaxially on each of said bolts intermediate said plates and backing piece, said first springs operative to bias the backing piece longitudinally away from the ends of said studs and the second springs operative to bias the nearest plate longitudinally away from said backing piece into frictional engagement with said discs and other plates to stop rotation of the shaft;

an electromagnet mounted on the backing piece and positioned to attract the closest annular plate when energized thereby disengaging the brake and allowing the shaft to rotate;

a cup mounted on said plate furthest from the hoist mechanism;

a post mounted on the cup, the post's axis being parallel with the axis of the shaft, and having a pin member extending radially outward from said post;

a hub rotatably mounted in said backing piece, the hub having a helical groove engaging said pin, said hub being rotated by said pin when said post is moved axially during disengagement of the brake, said hub being adapted to activate said adjustment means;

a plurality of toothed cups having a plurality of peripheral teeth, each cup adapted to engage a respective bolt for rotation therewith; and arms having a first end rotatably attached to said hub and a second detent end biased into engagement with said toothed cup, whereby when said hub rotates more than a predetermined arc, the arms will rotate the toothed cups and thereby said bolts an incremental amount into said studs to adjust the separation between the electromagnet and the closest plate.

* * * * *